(12) United States Patent
Muhlenbrock

(10) Patent No.: US 8,827,370 B2
(45) Date of Patent: Sep. 9, 2014

(54) VEHICLE SEAT ASSEMBLY

(75) Inventor: Ludger Muhlenbrock, Recklinghausen (DE)

(73) Assignee: Johnson Controls GmbH, Burscheid (DE)

( * ) Notice: Subject to any disclaimer, the term of this patent is extended or adjusted under 35 U.S.C. 154(b) by 1023 days.

(21) Appl. No.: 12/532,177

(22) PCT Filed: Mar. 14, 2008

(86) PCT No.: PCT/EP2008/002072
§ 371 (c)(1),
(2), (4) Date: Apr. 19, 2010

(87) PCT Pub. No.: WO2008/113527
PCT Pub. Date: Sep. 25, 2008

(65) Prior Publication Data
US 2010/0194170 A1    Aug. 5, 2010

(30) Foreign Application Priority Data

Mar. 21, 2007 (DE) .................. 10 2007 014 072
Mar. 21, 2007 (DE) .................. 10 2007 014 074
Oct. 16, 2007 (DE) .................. 10 2007 049 752

(51) Int. Cl.
*A47C 7/02* (2006.01)
*B60N 2/68* (2006.01)

(52) U.S. Cl.
CPC .................................... *B60N 2/682* (2013.01)
USPC ...................... 297/452.18; 29/521; 29/525.14

(58) Field of Classification Search
USPC ............ 297/452.18; 29/521, 525.13, 525.14
See application file for complete search history.

(56) References Cited

U.S. PATENT DOCUMENTS

| | | | |
|---|---|---|---|
| 2,668,584 A | | 2/1954 | Greitzer |
| 4,544,204 A | * | 10/1985 | Schmale .................. 297/452.18 |
| 5,487,219 A | * | 1/1996 | Ruehl et al. ..................... 29/897 |
| 6,352,311 B1 | | 3/2002 | Hayotte |
| 6,463,651 B1 | * | 10/2002 | Koeneker et al. ............... 29/513 |
| 7,237,846 B1 | * | 7/2007 | Arima ...................... 297/452.38 |
| 7,802,852 B2 | * | 9/2010 | Siegrist et al. ........... 297/452.18 |

(Continued)

FOREIGN PATENT DOCUMENTS

| | | |
|---|---|---|
| DE | 3043607 A1 | 11/1980 |
| DE | 86290479 U1 | 1/1987 |

(Continued)

OTHER PUBLICATIONS

European Patent Office, International Search Report, PCT/EP2008/002072, Jun. 13, 2008. (English translation provided).

(Continued)

*Primary Examiner* — David E Allred
(74) *Attorney, Agent, or Firm* — Butzel Long

(57) ABSTRACT

The invention relates to an assembly method for forming a seating structure for a vehicle seat, having a cross support (2) and a side support (3). For this purpose the cross support comprises at least one detent means (15), and the side support has at least one complementary detent means (8). During assembly, the detent means and the complementary detent means engage in each other, wherein the side support and the assembly support are positioned substantially perpendicular to each other. The cross support encompasses the side support for the engagement. The invention further relates to a seating structure produced in this way.

9 Claims, 4 Drawing Sheets

(56) References Cited

U.S. PATENT DOCUMENTS

| | | |
|---|---|---|
| 2004/0113481 A1 | 6/2004 | Saberan et al. |
| 2012/0169107 A1* | 7/2012 | Sakkinen et al. ........ 297/452.18 |
| 2013/0069415 A1* | 3/2013 | Yasuda et al. ............ 297/452.18 |

FOREIGN PATENT DOCUMENTS

| | | | |
|---|---|---|---|
| DE | 68919181 T2 | 9/1988 | |
| DE | 4446229 A1 | 12/1994 | |
| DE | 10039070 A1 | 8/2000 | |
| DE | 10332681 A1 | 3/2005 | |
| DE | 202005001773 U1 | 7/2006 | |
| DE | 102005033067 A1 | 1/2007 | |
| DE | 102006056859 B3 | 3/2008 | |
| EP | 0018851 A1 | 12/1980 | |
| EP | 65116 A1 * | 11/1982 | ............... B60N 1/00 |
| EP | 233822 A2 * | 8/1987 | ............... B60N 1/06 |
| EP | 1541455 A2 | 6/2005 | |
| FR | 2786743 | 12/1998 | |
| FR | 2786743 A | 6/2000 | |
| JP | 2000166691 | 6/2000 | |
| JP | 2002193005 A | 10/2002 | |
| JP | 2006193040 A | 7/2006 | |

OTHER PUBLICATIONS

Patent Treaty Cooperation, International Preliminary Report on Patentability, PCT/EP2008/002072, Sep. 22, 2009.

* cited by examiner

VEHICLE SEAT ASSEMBLY

CROSS REFERENCE TO RELATED APPLICATIONS

The present application is a U.S. National Stage filing of International Application No. PCT/EP2008/002072, filed on Mar. 14, 2008, titled "ASSEMBLY METHOD FOR FORMING A SEATING STRUCTURE OF A VEHICLE SEAT, AND SEATING STRUCTURE" which claims priority to German Patent Application No. DE 10 2007 014 074.8 filed Mar. 21, 2007; German Patent Application No. DE 10 2007 014 072.1 filed Mar. 21, 2007; and German Patent Application No. DE 10 2007 049 752.2 filed Oct. 16, 2007, the entire disclosures of which are incorporated herein by reference.

BACKGROUND

The present disclosure relates to an assembly method for forming a seating structure of a vehicle seat with a cross support and a side support.

Assembly methods in which a detent or a detent means are connected by latching are generally known. For example, the German patent DE 10 2004 053 257 A1 discloses an arrangement for fastening a profile section to a carrier, the profile section and/or the carrier having at least one projecting fixing element. A latching part with a latching tongue is, for example, disclosed as the fixing element. However, a disadvantage of the known assembly methods is that the components to be assembled are likely to slip out of place with respect to one another. As a result of this misalignment the latching device and/or means can be damaged during an attempt to effect the latching, so that the entire component that incorporates the components of the latching device and/or latching means must be rejected as waste. In addition, in the event that the parts are finally fixed to one another, for example by welding, they can be incorrectly positioned with respect to one another.

Accordingly, there long remains a need for an assembly method and construction in which correct alignment of the component parts with respect to one another is already ensured during assembly and before the component parts are fixed.

SUMMARY

In one exemplary embodiment there is disclosed an assembly method for forming a seating structure of a vehicle seat with a cross support and a side support. In this assembly method at least one detent means of the cross support engages in a latching manner with at least one complementary detent means of the side support. During the assembly method the cross support and the side support are positioned substantially at right angles to one another, the cross support extending around the side support for the latching engagement. Advantageously, therefore, slipping of the side support with respect to the cross support during assembly is substantially ruled out by the extending of the cross support around it, whereby the latching engagement can take place without misalignment. In this way the assembly method can be carried out substantially more quickly and by relatively unskilled personnel, whereby manufacturing cost and time can be saved. In addition, the risk of damage to the detent means by incorrect latching positions during assembly is substantially reduced.

In another exemplary embodiment, the side support preferably has four faces, at least portions of two faces being disposed horizontally and at least portions of two faces being disposed vertically, and the vertical faces being approximately perpendicular to the horizontal faces. The two horizontal faces preferably run parallel to one another. Preferably, as the cross support extends around the side support one horizontal face of the side support is completely covered by the cross support within an overlap area and one vertical face of the side support is at least partially covered by the cross support within the overlap area.

In another exemplary embodiment of the method of assembly, the latching engagement preferably serves as the first fixing of the side support and the cross support to one another. For a final fixing of the cross support and the side support to one another, the cross support and the side support are preferably secured in their final position with respect to one another by a additive material joint, preferably by welding. However, prior to this final fixing it is provided that the cross support and the side support are connected directly to one another in a form-fitting manner by latching engagement. Through this first fixing, the final fixing by a material joint is simplified, since in this case the cross support and the side support are substantially no longer able to be displaced with respect to one another.

In another exemplary embodiment, during the first fixing, the detent means of the cross support preferably latches with the complementary detent means of the side support during the execution of an assembly movement, the cross support being fixed to the side support through latching engagement in relation to a movement opposite to the assembly movement. In this way the first fixing of the cross support to the side support is advantageously produced by only a single movement or, in an alternative embodiment, by two movements. Complex and costly fixing tools or a plurality of assembly steps for a first fixing are therefore unnecessary.

Furthermore, in an alternative embodiment, the latching engagement may preferably be released again by a movement opposite to the assembly movement. In order that the detent means and the complementary detent means can be released from one another, a greater force must preferably be used than for the latching engagement itself. The first fixing between the cross support and the side support is thus advantageously reversible, so that even in the event of an assembly error the cross support can be released from the side support. Because of the greater force which must be exerted in this case, unintended releasing of the fixing is made more difficult.

In one exemplary embodiment, at least one latching lug on the cross support as the detent member or means and at least one folded edge as the complementary detent member or means are preferably provided. In this case, during assembly the latching lug preferably engages behind the folded edge so that a first fixing of the side support and the cross support to one another is effected. Preferably, the folded edge is provided integrally with the side support and/or the latching lug is provided integrally on the cross support. In this case "integrally" is to be understood to mean that the folded edge and/or the latching lug have been produced from the same material as the side support and/or the cross support and in one piece with the side support and/or the cross support. For example, by a suitable shape of the forming tool the latching lug may be formed directly on the cross support during the production thereof. The forming of the detent member and/or of the complementary detent member is thereby made especially rapid, so that the production process of the cross support and/or the side support is not lengthened. In addition, the connection between the detent member and the cross support and/or between the complementary detent member and the side support is especially intimate and stable. Unintended release of the detent member from the cross support and/or of the complementary detent member from the side support is thereby advantageously made more difficult.

In this exemplary embodiment the latching lug of the cross support is especially preferably placed on the side support in order to form the latching engagement. In this case, therefore, the side support serves as orientation for the position of the cross support. In order to place the cross support on the side support in only a particular region, for example, markings may be applied to the side support. In this case assembly becomes especially uncomplicated because the cross support is positioned by means of the marking and then placed.

In a an alternate or second exemplary embodiment the cross support has at least one recess as the detent member or means and the side support has at least one tab as the complementary detent member or means. In this case the tab is preferably received by the recess in order to produce the latching engagement. The recess is preferably formed such that a positive and/or nonpositive connection between the tab and the recess is formed when the tab is located in the recess. In this second embodiment, too, the detent member and/or the complementary detent member is/are preferably formed integrally with the cross support and/or the side support.

In this second embodiment the recess preferably has at least one further latching lug which is inserted in an opening of the tab. The insertion of the further latching lug into the opening preferably produces a further positive and/or nonpositive connection between the tab and the recess. In this second embodiment, therefore, the cross support and the side support are advantageously connected to one another by means of two positive and/or nonpositive connections. In addition, by inserting the tab into the recess it is achieved that the cross support engages with the side support in a predefined position with respect to the side support. The recess therefore serves as a marking.

In the second embodiment, the cross support is preferably displaced on the side support to effect the latching engagement. In this case the tab is guided into the recess. The side support and the recess consequently form a guide for the cross support during the latching engagement, so that an incorrect position of the cross support with respect to the side support during the first fixing can be substantially ruled out.

After the latching engagement, the side support and the cross support are preferably welded to one another, so that a material joint is produced. Self-evidently, the cross support and the side support may also be bonded and/or screwed and/or riveted to one another. Especially preferably, the side support and the cross support are connected to one another by clinching. Clinching, which is taught, for example, in DIN 8593, has the advantage, inter alia, that no pre-punching process needs to take place for the connection. In this case the material joint preferably represents the final fixing of the cross support and the side support to one another.

In one exemplary embodiment, there is disclosed a seating structure for a vehicle seat, the seating structure having at least one cross support and one side support. In this case the cross support has at least one detent means and the side support has at least one detent means complementary thereto. After the latching engagement of the cross support with the side support by means of the detent member and the complementary detent member, the cross support extends around the side support at least in an overlap area.

In one exemplary embodiment the side support preferably has at least one folded edge as complementary detent means and the cross support has at least one substantially vertical wall. In addition, the vertical wall of the cross support has as detent means at least one latching lug which engages in the folded edge of the side support. In this case the latching lug and the folded edge preferably form the latching connection by means of which the cross support and the side support are latched to one another. The seating structure preferably has two cross supports and two side supports, one cross support always being fixed with two side supports.

In another or second exemplary embodiment the side support has at least one tab as the complementary detent member or means and the cross support has as the detent member or means at least one recess with further vertical walls and at least one further latching lug.

The recess of the cross support is preferably tub-shaped, at least one further vertical wall of the tub-shaped recess being removed, and/or the recess being substantially rectangular. The removal of at least one further vertical wall may be effected, for example, by punching. During assembly the tab of the cross support is preferably guided through the removed further vertical wall. Two further vertical walls of the recess are preferably removed. The formation of the detent member and the complementary detent member is advantageously possible in a rapid and uncomplicated manner, so that the detent member and the complementary detent member can be formed during the production of the cross support and the side support.

The further latching lug of the cross support is preferably inclined, and/or the tab is adapted substantially to the shape of the recess. The tab is preferably dimensioned such that it can be received substantially completely by the recess. For example, the tab is rectangular if the recess is rectangular. The tab is adapted in its dimension to the recess if, for example, it has a depth corresponding to the depth of the recess. In this way the tab inside the recess advantageously does not extend beyond the cross support, so that unwanted tearing-off of the tab can be avoided.

BRIEF DESCRIPTION OF THE DRAWINGS

The exemplary embodiments of the disclosure are described in more detail and are represented in the following Figures, in which.

DETAILED DESCRIPTION

FIGS. 1 to 4 represent schematically a first exemplary embodiment of a cross support 2 and a side support 3 as part of a seating structure 1 for a vehicle seat.

The seating structure 1 preferably consists of different frame parts which have a main direction of extension and are connected to one another to form a frame-like structure. In particular, the frame parts are secured in their final position with respect to one another by a material joint, preferably by welding; however, bonding, riveting or screwing of the frame parts to one another is also possible. Prior to this final fixing it is preferably provided that the frame parts are connected directly to one another in a form-fitting manner and, in particular, are latched together. It is provided, in particular, in a first exemplary embodiment to configure a front cross support of the seating structure 1 such that it can be latched by being pushed from above (that is, in the Z-direction of the vehicle) onto a side support 3. Through the latching engagement, not only is handling of the preassembled frame parts simplified, but, in addition, the acoustic signal of latching provides feedback regarding the correct position of the frame parts, that is, of the cross support 2 and the side support 3, with respect to one another.

Figure 1:
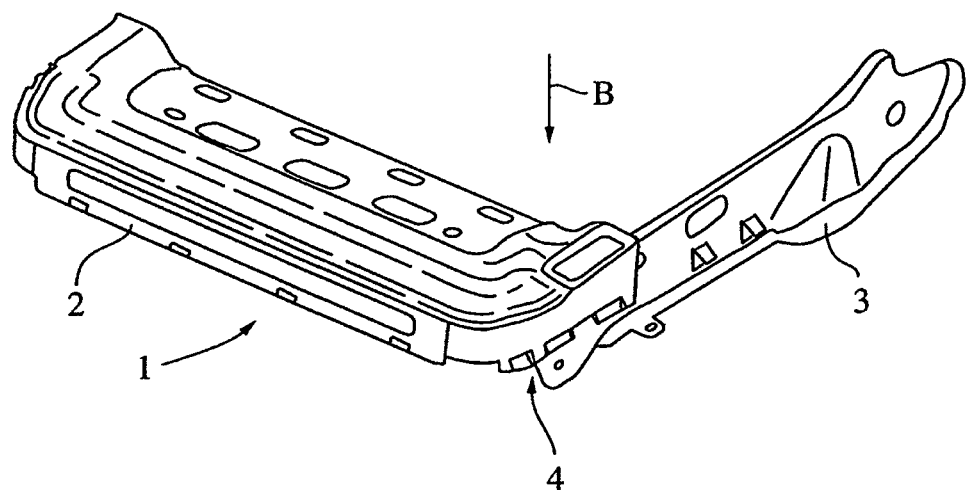
FIG. 1 represents schematically a cross support and a side support in a first exemplary embodiment.
Figure 2:
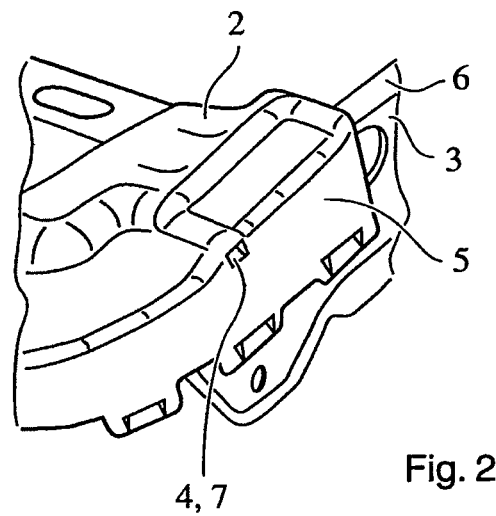
FIG. 2 represents schematically a detail view of the exemplary embodiment.

FIG. 1 represents schematically a partially preassembled structure 1 of a seat part including the front cross support 2 and the side support 3. The structure 1 may also be referred to as the seating structure 1. The cross support 2 is configured to be able to be fitted from above onto the side support 3 (arrow B). The cross support 2 and the side support 3 are preferably pressed and punched sheet steel parts which are provided with plug-in connections 4 which can be latched with one another. In particular, as can be seen from FIGS. 2 to 4, lateral, downwardly projecting vertical walls 5 of the cross support 2 extend around the side support 3. The spatial references relate to the usual installed position in the vehicle. Because the cross support 2 extends around the side support 3, slippage of the side support 3 perpendicularly to the assembly direction B is prevented. In this way the position of the side support 3 with respect to the cross support 2 for the latching engagement can advantageously be ensured. This also makes possible a permanently reproducible position of the side support 3 with respect to the cross support 2. The side support 3 in its turn is equipped with an upper (viewed from assembly direction B), horizontally outwardly oriented folded edge 6, behind which engages a latching lug 7 projecting inwardly from the vertical wall 5 (FIG. 2). The latching lug 7 of the cross support 2 may also be referred to as the detent member or detent means 7. Consequently, the folded edge 6 of the side support 3 may be referred to as the complementary detent member or means 6. Self-evidently, as a result of suitable contouring of cross support 2 and side support 3, the fitting of the cross support 2 onto the side support 3 in the direction of the arrow B is only possible if the cross support 2 is in a position relative to the side support 3 which is correct with respect to the other directions.

Figure 3:
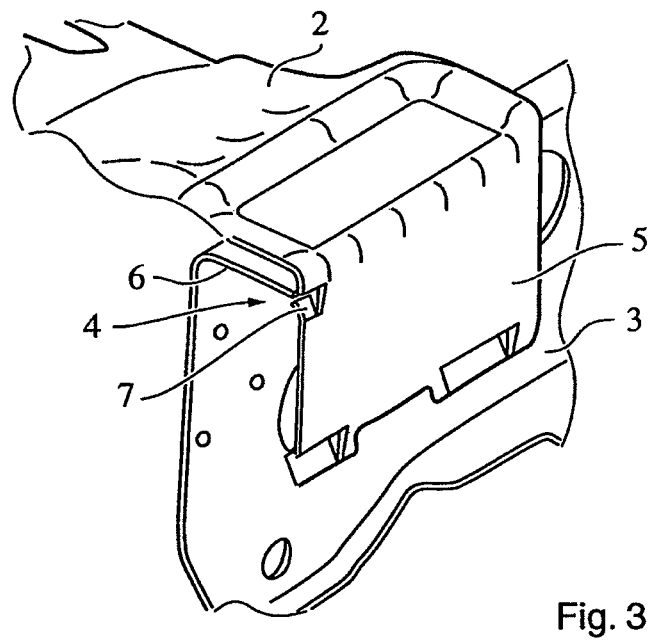
FIG. 3 represents schematically the latching connection of the exemplary embodiment.
Figure 4:
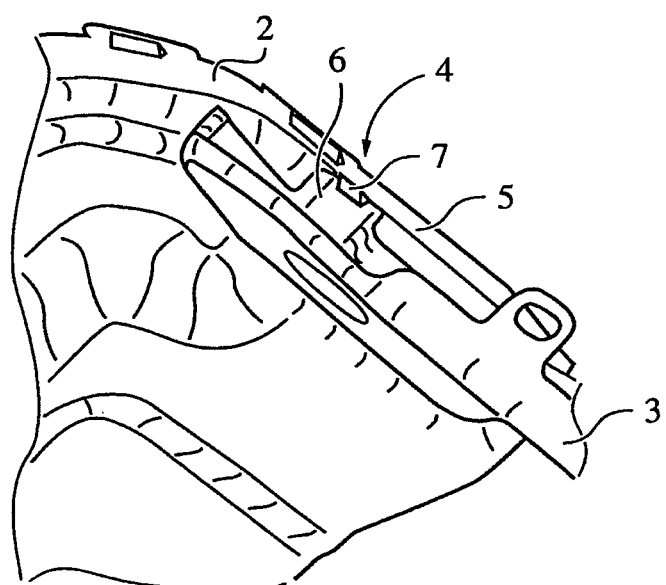
FIG. 4 represents schematically a view of the latching connection of the exemplary embodiment.

FIGS. 3 and 4 show schematically a detail view of the seating structure 1. In the exemplary embodiment the latching lug 7 is inclined in such a manner that it offers only slight resistance when the cross support 2 is pushed on in the direction provided for manual preassembly (arrow B in FIG. 1), whereas after the latching engagement withdrawal in the opposite direction is possible only with the exertion of major force and/or with the use of tools. In this way a first fixing of the cross support 2 and the side support 3 with respect to one another is advantageously effected.

FIGS. 5 to 8 represent schematically a second exemplary embodiment of a seating structure 1 of a vehicle seat.

In this second exemplary embodiment, too, it is provided that the frame parts are connected directly to one another in a form-fitting, in particular latching, manner prior to their final connection. In particular, it is provided that the front cross support of the seating structure 1 is configured to be latchable to the side support 3 by pushing it thereon against the seat longitudinal direction (that is, usually in the X-direction of the vehicle). Not only is handling of the preassembled frame parts simplified through the latching engagement, but, in addition, the acoustic signal of latching provides feedback on the correct positioning of the frame parts with respect to one another.

Figure 5:
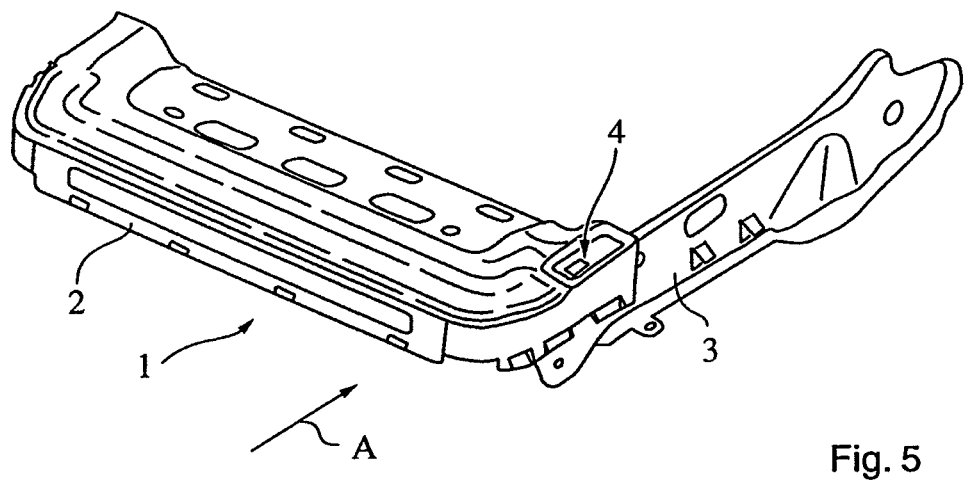
FIG. 5 represents schematically an exemplary second embodiment of the cross support and the side support.
Figure 6:
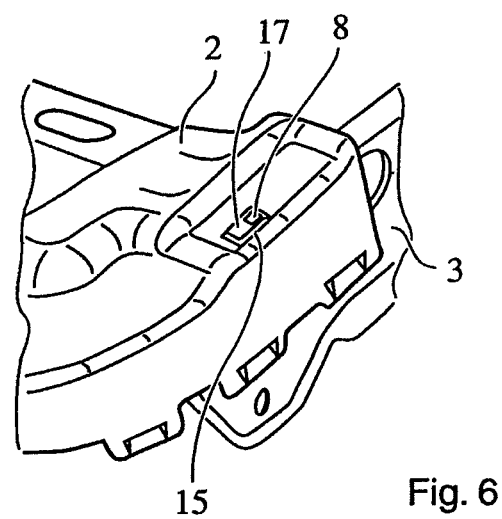
FIG. 6 represents schematically a detail of the second exemplary embodiment.
Figure 7:
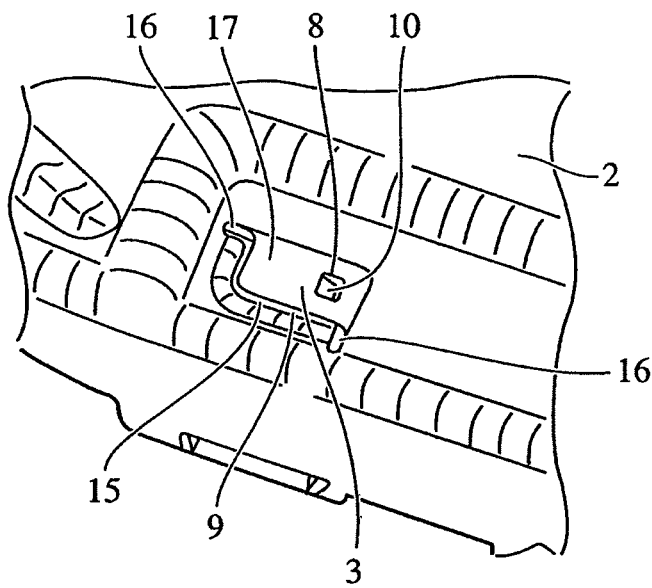
FIG. 7 is a schematic top view of the latching connection of the second exemplary embodiment.
Figure 8:
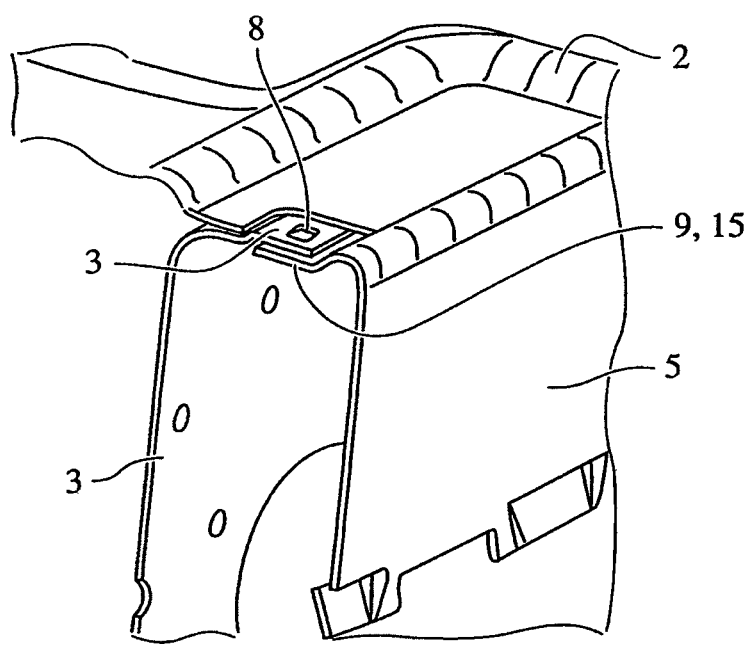
FIG. 8 is a schematic side view of the latching connection of the second exemplary embodiment.

FIG. 5 show schematically a partially preassembled structure 1 of a seat part consisting of the front cross support 2 and the side support 3. The cross support 2 is configured to be able to be fitted to the side support 3 against the seat longitudinal direction (arrow A). In this second embodiment also the cross support 2 and the side support 3 are preferably pressed and punched sheet steel parts which are provided with plug-in connections 4 which can be latched to one another. In particular, as is apparent from FIGS. 7 and 8, the cross support 2 has a tub-shaped, rectangular recess 15 the inner and rear further vertical walls 16 of which are removed. In this case the spatial references relate to the usual installed situation in the vehicle. Insertable into the recess 15 is a tab 17 of the side support 3 which is configured to fit therein and has an opening 8 into which a further latching lug 10 projecting up from the base 9 of the recess 15 can be latched (FIGS. 6 and 8). The recess 15 of the cross support 2 can also be referred to as detent means 15. Likewise, the further latching lug 10 can be referred to as detent member or detent means 10. Consequently, the tab 17 of the side support 3 can also be referred to as complementary detent member or complementary detent means 17. Likewise, the opening 8 in the tab 17 can be referred to as complementary detent member or complementary detent means 8. The further latching lug 10 has an inclined configuration such that it offers only slight resistance to the sliding of the cross support 2 in the direction provided for manual preassembly (arrow A in FIG. 5), whereas, after the latching engagement, withdrawal thereof in the direction opposite to arrow A is possible only with the exertion of major force and/or the use of tools. As the cross support 2 is slid onto the side support 3 the vertical wall 5 of the cross support 2 extends around the side support 3. The side support 3 can therefore be positioned with respect to the cross support 2 for the latching engagement.

Consequently, in both exemplary embodiments the cross support 2 and the side support 3 are advantageously latchable to one another, the cross support 2 extending around the side support 3 in both embodiments. The side support 3 is thereby prevented from slipping relative to the cross support 2 when it is attempted to establish the latching connection between the two parts. The two parts are therefore advantageously prevented from latching in an incorrect position with respect to one another, and the detent means from being damaged during latching as a result of the incorrect position of the parts with respect to one another.

The invention claimed is:

1. An assembly method for forming a seat bottom structure for use in a vehicle seat, the seat bottom structure having a cross support and a side support, the cross support having at least one detent member and the side support having at least one complementary detent member for being connected to one another in a latching manner, the assembly method comprising the steps of: positioning the cross support and the side support at substantially right angles to one another; sliding the cross support in a direction parallel to a longitudinal axis of the side support to form a latching engagement; and locating a tab in a recess, the tab having an opening latchably engaging a lug projecting from the recess.

2. The assembly method of claim 1 further comprising fixing the cross support to the side support.

3. The assembly method of claim 2 wherein fixing the cross support to the side support is effected using welding.

4. The assembly method of claim 1 further comprising the step of inserting the further latching lug of the recess (15) in the opening of the tab.

5. The assembly method of claim 4 wherein the step of placing the cross support on the side support includes the step of sliding the cross support onto the side support.

6. The assembly method of claim 4 further comprising the step of, after the latching engagement of the side support with the cross support, fixedly joining the side support and the cross support.

7. A seat bottom structure for use in a vehicle seat, the seat bottom structure comprising a side support and a cross support and the cross support having at least one detent member and the side support having at least one complementary detent member, wherein the cross support extends around the side support after a latching engagement of the side support and the cross support with one another, wherein the cross support has a recess having a further latching lug and the side support has a tab, the recess of the cross support receiving the tab of the side support by sliding the cross support relative to the side support in a direction substantially perpendicular to a length of the cross support while maintaining a perpendicular relationship between the cross support and the side support.

8. The seat bottom structure of claim 7 wherein the recess is tub-shaped and having walls of the tub-shaped recess being removed.

9. The seat bottom structure of claim 7 wherein the further latching lug is inclined and the tab substantially matches the shape of the recess and the tab being dimensioned to be received by the recess.

\* \* \* \* \*